United States Patent [19]

Otake et al.

[11] Patent Number: 5,337,069
[45] Date of Patent: Aug. 9, 1994

[54] STILL PICTURE DISPLAY APPARATUS AND EXTERNAL STORAGE DEVICE USED THEREIN

[75] Inventors: Masahiro Otake, Kyoto; Toyofumi Takahashi, Tokyo; Satoshi Nishiumi, Kyoto; Takuo Mukai, Tokyo, all of Japan

[73] Assignees: Nintendo Co., Ltd., Kyoto; Ricoh Co., Ltd., Tokyo, both of Japan

[21] Appl. No.: 152,928

[22] Filed: Nov. 16, 1993

Related U.S. Application Data

[63] Continuation of Ser. No. 749,533, Aug. 26, 1991, abandoned.

[30] Foreign Application Priority Data

Aug. 27, 1990 [JP] Japan .................. 2-225672

[51] Int. Cl.⁵ ............................................. G09G 1/16
[52] U.S. Cl. .................................... 345/123; 345/192
[58] Field of Search ............... 364/410; 345/123, 127, 345/119, 192, 121, 126, 26–28

[56] References Cited

U.S. PATENT DOCUMENTS

| | | | |
|---|---|---|---|
| 4,232,374 | 11/1980 | Chung | 364/900 |
| 4,309,700 | 1/1982 | Kraemer | 340/726 |
| 4,445,114 | 4/1984 | Stubben | 340/726 |
| 4,593,407 | 6/1986 | Konishi et al. | 340/727 |
| 4,672,541 | 6/1987 | Bromley et al. | 364/410 |
| 4,813,671 | 3/1989 | Charpentier | 273/1 |
| 4,824,106 | 4/1989 | Ueda et al. | 273/1 |
| 4,831,556 | 5/1989 | Oono | 340/721 |
| 4,864,289 | 9/1989 | Nishi et al. | 340/725 |
| 4,922,238 | 5/1990 | Aoki et al. | 340/726 |

FOREIGN PATENT DOCUMENTS 0330732 9/1989 European Pat. Off. .
0450602A2 10/1991 European Pat. Off. .

Primary Examiner—Ulysses Weldon
Assistant Examiner—Gin Goon
Attorney, Agent, or Firm—Nixon & Vanderhye

[57] ABSTRACT

A still picture display apparatus displays a still picture in which characters each composed of combination of a predetermined number of dots on a raster scan monitor in accordance with character data and program data both stored in an external storage device in advance. Offset data of at least one of a horizontal direction and a vertical direction correspondingly to each character is stored in an offset table formed in the external storage device. A picture processing unit determines an address on the basis of the offset data and at least one of a horizontal position and a vertical position, and reads video data from a video data memory according to the address to apply to the raster scan monitor.

7 Claims, 14 Drawing Sheets

F I G. 4
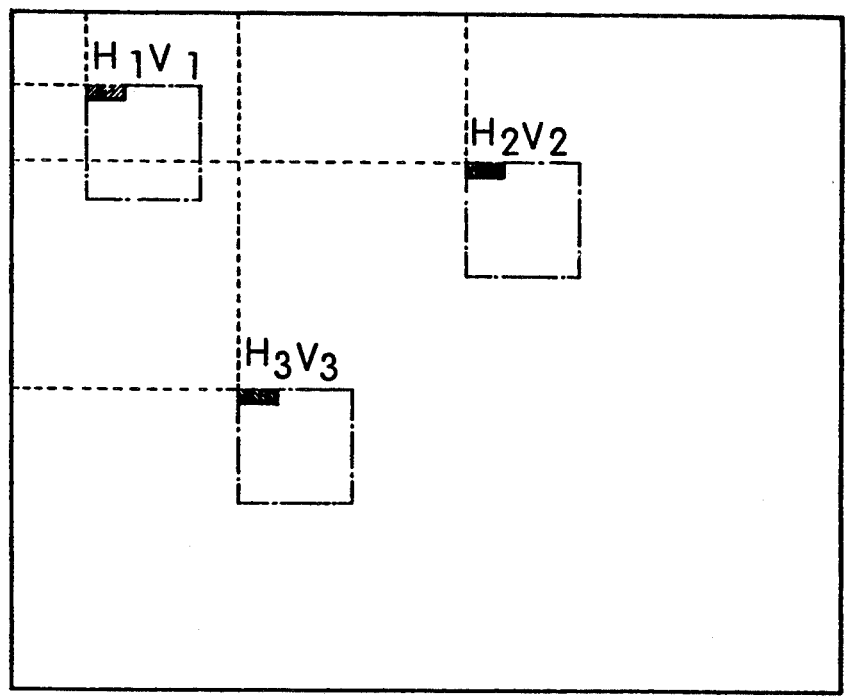

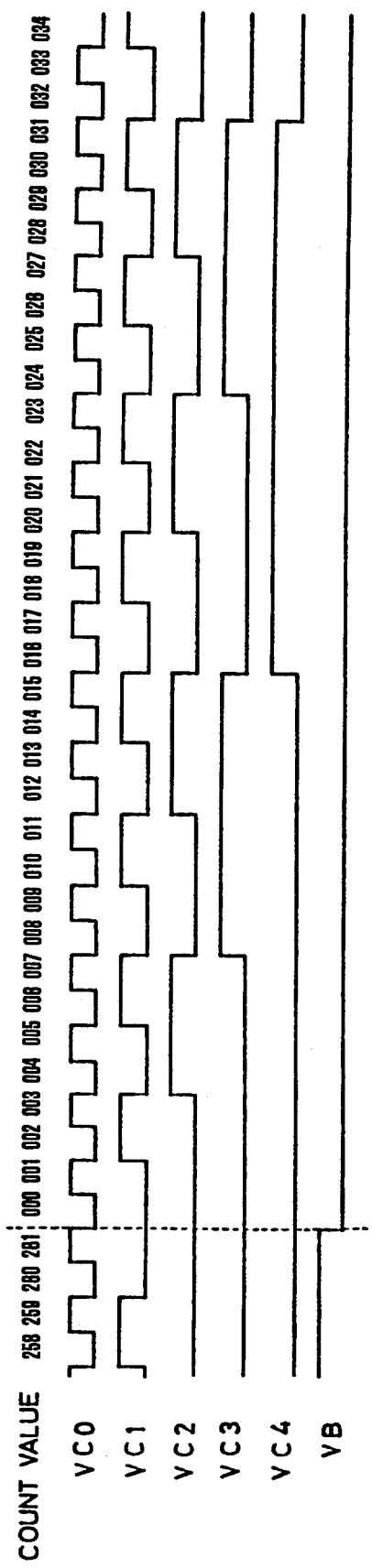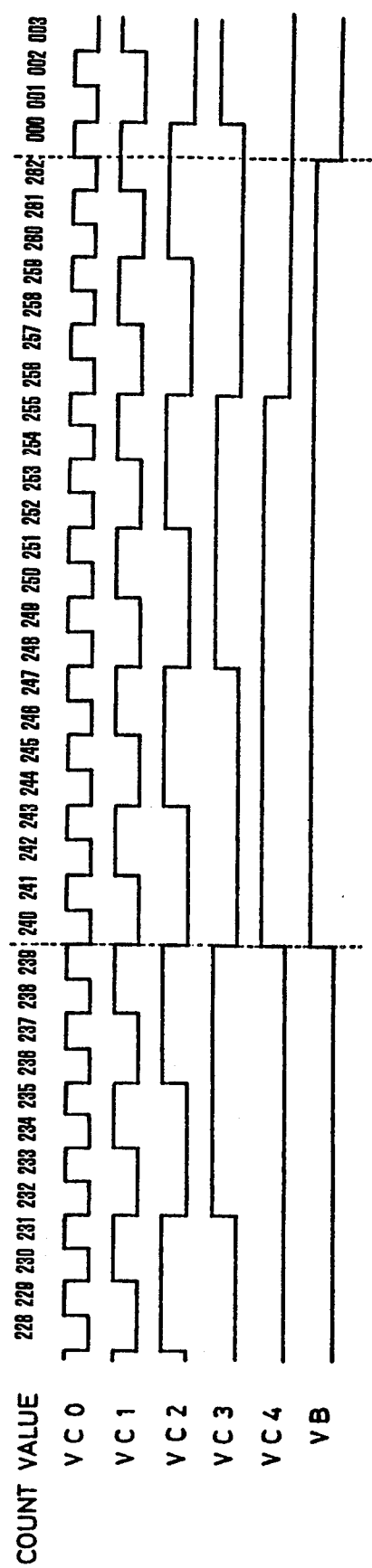

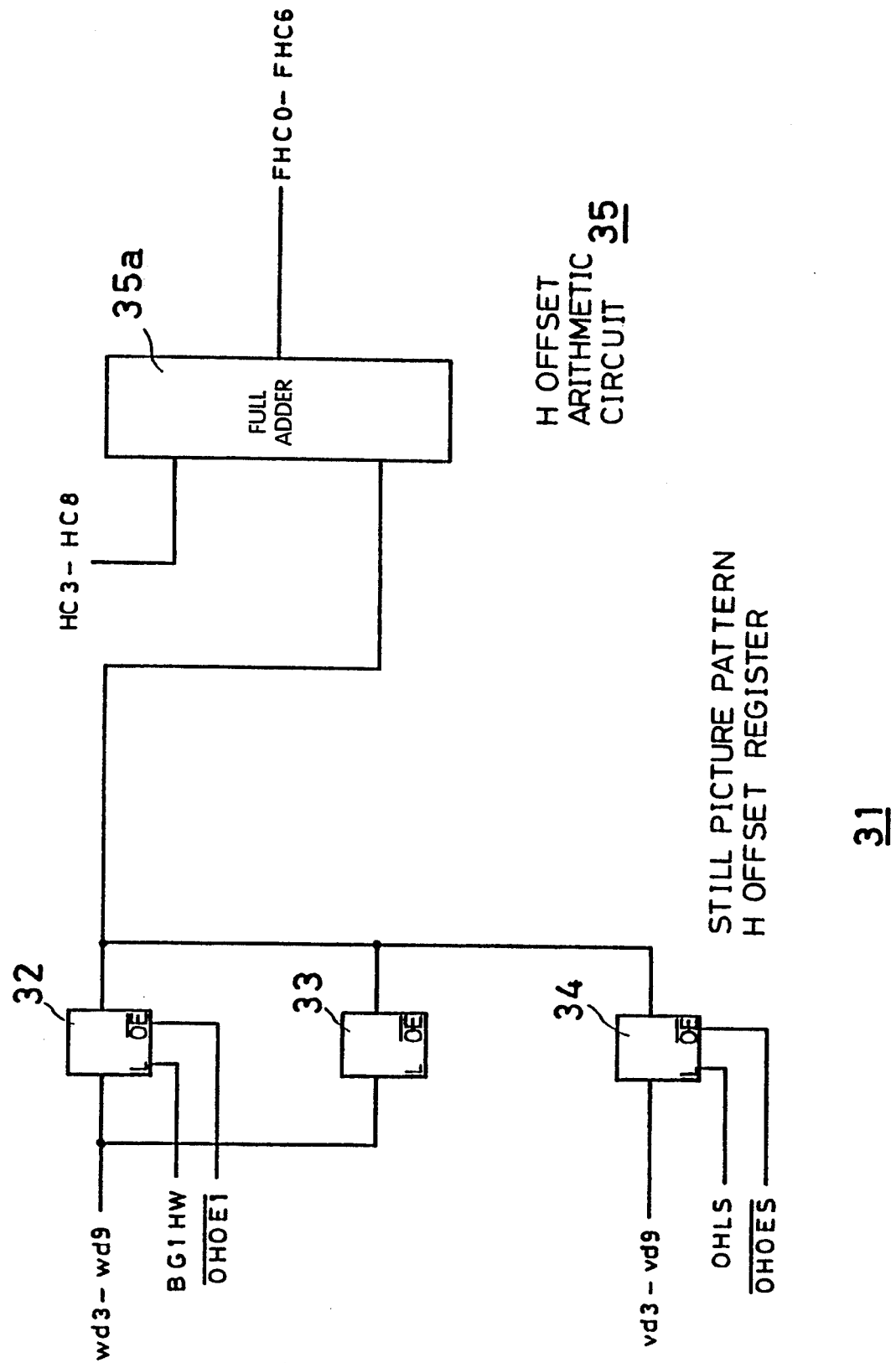

STILL PICTURE PATTERN
V COUNTER VALUE
PROCESSING CIRCUIT

42

STILL PICTURE PATTERN ADDRESS
SELECTING CIRCUIT    36

| SELECTOR | | OUTPUT | | | | | | | | | | | | | |
|---|---|---|---|---|---|---|---|---|---|---|---|---|---|---|---|
| M2S1 | M2S0 | AC3 | AC4 | AC5 | AC6 | AC7 | AC8 | AC9 | AC10 | AC11 | AC12 | AC13 | AC14 | | |
| L | L | FVC0 | FVC1 | FVC2 | FVC3 | FVC4 | FVC5 | FVC6 | FVC7 | FVC8 | FVC9 | L | L | | |
| L | H | M2D0 | FVC0 | FVC1 | FVC2 | FVC3 | FVC4 | FVC5 | FVC6 | FVC7 | FVC8 | FVC9 | L | | |
| H | L | M2D0 | M2D1 | FVC0 | FVC1 | FVC2 | FVC3 | FVC4 | FVC5 | FVC6 | FVC7 | FVC8 | FVC9 | | |
| H | H | — | — | — | — | — | — | — | — | — | — | — | — | | |

STILL PICTURE DISPLAY APPARATUS AND EXTERNAL STORAGE DEVICE USED THEREIN

This is a continuation of application Ser. No. 07/749,533, filed Aug. 26, 1991, now abandoned.

CROSS-REFERENCE TO RELATED APPLICATIONS

This application is related to U.S. application Ser. No. 07/651,265, entitled, "Video Processing Apparatus", which was filed on Apr. 10, 1991, naming Takahishi et al as inventors, which application is hereby expressly incorporated herein by reference. This application is also related to a U.S. application Ser. No. 07/749,527 filed concurrently herewith and entitled, "Video Display Apparatus and External Storage Device Used Therein", naming Otake et al, which application is hereby expressly incorporated herein by reference. This application is also related to a U.S. patent application Ser. No. 07/749,530 filed concurrently herewith entitled "Direct Memory Access Apparatus In Image Processing System and External Storage Device Used Therein" naming Otake et al as inventors, which application, is hereby expressly incorporated herein by reference.

This application is also related to U.S. application Ser. No. 07/928,076, entitled "TV Game Machine" which was filed on Aug. 23, 1991, naming Inoue et al as inventors. This latter application discloses an exemplary mechanical design for a video game control deck and associated removable game cartridge, which design may be used to house the electronics described herein. This application is also expressly incorporated herein by reference.

BACKGROUND OF THE INVENTION

1. Field of the invention

The present invention relates to a still picture display apparatus and an external storage device used in the apparatus. More specifically, the present invention relates to a still picture apparatus which can scroll still pictures in a picture processing device, for example, a personal computer, a video game machine or the like.

2. Description of the Prior Art

For example, Japanese patent publication No. 2-7478 published on Feb. 19, 1990 (corresponding to U.S. Pat. No. 4,824,106) discloses a picture display apparatus which can scroll a still picture. In the prior art, scrolling on an entire monitor screen or partial scrolling of each line is possible.

For example, when a part of still picture divided in the vertical direction is scrolled the arrow direction as shown in FIG. 18, by using a game program, a vertical direction position (V position) on the monitor screen to be scrolled may be detected, and a horizontal offset value of lines on and after the V position may be changed to a horizontal blanking period (85×18 nsec).

On the other hand, in order to obtain variety of scroll of still pictures, it is desirable to divide the monitor screen in the horizontal direction and scroll a part thereof in the vertical direction as shown in FIG. 19.

In the prior art, in order to achieve scrolling shown in FIG. 19, a horizontal direction position (H position) on the monitor screen may be detected with a program in progress, and an offset value in the vertical direction may be changed on reaching the H position. However, in order to adopt this method, it is necessary to rewrite the offset value in the V direction during a scanning period. For example, in order to move one character (8×8 dots) in the V direction, the value must be written during a display period of one character, e.g., 8×18 nsec. It is practically impossible to rewrite the offset value in the V direction in such a short time. Therefore, in the prior art, a partial scrolling as shown in FIG. 19 has not been realized.

Also, scrolling is disclosed, for example, in Japanese patent publication No. 63-32472 published on Jun. 30, 1988. In this other prior art, an offset value from an MPU is written into a scroll index latch, and the offset value and a count value of a horizontal synchronous counter are calculated by an adder and an address is designated to read and delay the data thereby to realize a scrolling. Also in this prior art, an initial value and the offset value must be rewritten for scrolling by a CPU or MPU. Thus, when the CPU or MPU is concerned with scrolling, in order to rewrite data within a short time as mentioned above, the CPU or MPU of high speed is required. Under such conditions, this method cannot be used for a video game machine or the like which is accompanied by a condition that it must be cheap.

Furthermore, there is Japanese patent application laid-open No. 58-81065 laid open on May 1, 1983. This prior art carries out similar processing to that of Japanese patent publication No. 63-32472 concerning a plurality of still picture cells, and therefore the same problems remain.

SUMMARY OF THE INVENTION

Therefore, a principal object of the present invention is to provide a still picture display apparatus in which a scrolling can be performed in a portion of a monitor screen divided in a horizontal direction.

Another object of the present invention is to provide such a still picture display apparatus with low cost.

Still another object of the present invention is to provide an external storage device which can be effectively used in the above described still picture display apparatus.

In brief, the present invention is in a still picture display apparatus which displays still pictures containing an arrangement of a predetermined number of characters being constituted by a combination of a given number of dots, comprising first storage means for storing character data of the characters; second storage means for storing offset data in at least one of a horizontal direction and a vertical direction correspondingly to the characters displayed on at least one line in the horizontal direction; first read means for reading the offset data corresponding to the characters of the first storage means from the second storage means when the characters are displayed; and second read means for reading the character data to be displayed from the first storage means based on the offset data of the characters read by the first read means and a horizontal position and a vertical position on the raster scan monitor to apply the same to the raster scan monitor.

An external storage device according to the present invention is used in association with a still picture display apparatus which displays a still picture containing an arrangement of a predetermined number of characters being constituted by a combination of a predetermined number of dots. The external storage device comprises first storage means for storing character data of the characters; and second storage means for storing offset data in at least one of a horizontal direction and a vertical direction correspondingly to the characters displayed on at least one line in the horizontal direction, wherein the still picture display apparatus includes first read means for reading the offset data corresponding to the characters of the first storage means from the second storage means when the characters are displayed; and second read means for reading the character data to be displayed from the first storage means based on the offset data of the characters read by the first read means and a horizontal position and a vertical position on the raster scan monitor to apply the same to the raster scan monitor.

A still picture display apparatus according to the invention displays still pictures in arrangement of N characters in the horizontal direction and M characters in the vertical direction being constituted by combination of predetermined number of dots (e.g., 8×8 dots) onto a raster scan monitor. For example, a video data memory unit comprising a RAM stores character data. Offset data of at least one of the horizontal direction and the vertical direction corresponding to each character are stored, for example, in an offset table to which the video processor has access. Based on the offset data corresponding to the characters read from the first storage means by the first read means and at least one of the horizontal direction and the vertical direction on the raster scan monitor, an address is determined, and the second read means reads out character data from the first storage means according to the address and applies the data to the raster scan monitor.

According to the present invention, since the offset data are stored in advance and read as necessary, processing can be performed in such a very short time as a character unit. Thus, a partial scrolling as shown in FIG. 19 can be easily accomplished although it was difficult to be realized in the prior art.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 4 is an illustrative view showing a monitor screen indicating a stored state in a screen RAM;

FIG. 5 is an illustrative view showing an offset data table formed in a VRAM;

FIGS. 7, 8A and 8B are timing charts showing signals from the timing signal generator in FIG. 6;

FIG. 11 is a block diagram showing a still picture pattern H offset data register and an H offset arithmetic circuit included in the still picture address control circuit of FIG. 1;

DETAILED DESCRIPTION OF THE PREFERRED EMBODIMENTS

The following description relates to embodiments where a still picture display apparatus of the present invention is applied to a television game machine, but it is pointed out beforehand that the present invention can be applied to other similar picture processing apparatus which are used in connection with a raster scan monitor.

Prior to a description of embodiments, a raster scan monitor will be explained to which the embodiments are applied. Generally, an RGB monitor or a CRT display is used as a monitor of a television game machine. One screen of such a raster scan monitor is divided into picture elements (pixel) of 256×256 dots. However, since the dot number in the vertical direction includes portions of several upper and lower lines where pictures cannot be displayed correctly, 224 vertical dots are utilized. Accordingly, when one character that is a minimum unit of a still picture or a moving picture is constituted by 8×8 dots, characters of 32×28=896 can be displayed simultaneously on one screen.

Figure 2:
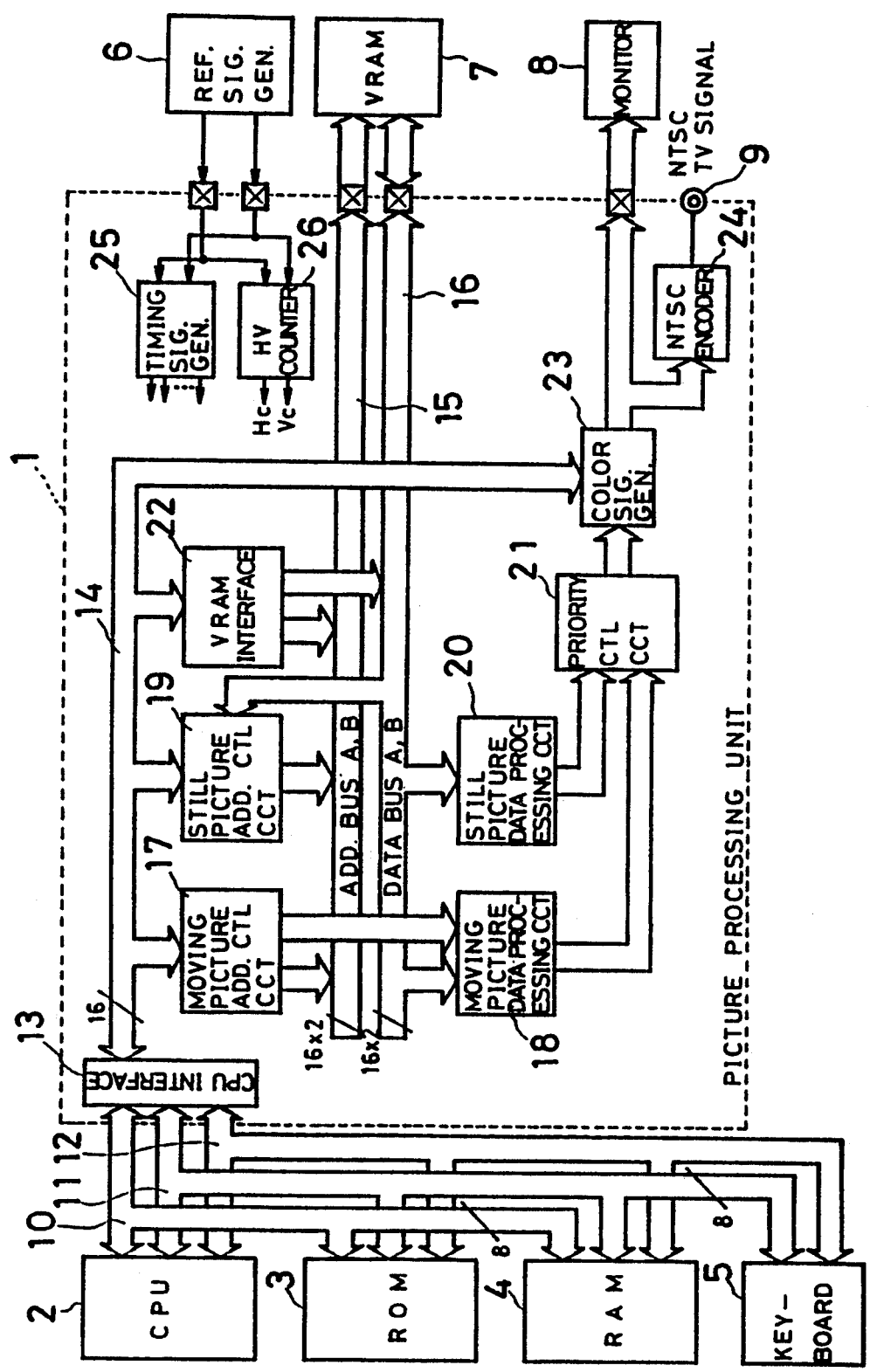
FIG. 2 is a block diagram showing a television game machine to which the present invention can be applied.

In a television game machine shown in FIG. 2, a still picture (or background picture) constituting the background which cannot be changed individually by an operation of a player and a moving picture movable by an operation of the player or the control of a CPU are independently controlled. Therefore, this embodiment is provided with a picture processing unit 1 which applies a video signal composing a still picture and a moving picture to a TV display 8. The picture processing unit 1 contains a still picture address control circuit 19 which seeks a read address for a VRAM 7 where picture data of a still picture are stored for scroll processing.

In FIG. 2, a read only memory (ROM) 3, a RAM 4 and a keyboard 5 are connected to a CPU 2 for carrying out various kinds of control of a television game machine through an address bus 10, a data bus 11 and a control bus 12.

The ROM 3 stores program data to control the television game machine, necessary data to carry out the program and character data, and are contained, for example, in a cartridge (not shown) which is detachable from the television game machine. The program data include data to determine what kinds of moving characters and/or background characters should be displayed at what timing and at what position, and data such as offset tables.

In addition, moving picture attribute data indicating the moving picture characters include horizontal position data (Hc; 8 bits) designating the horizontal position, vertical position data (Vc; 8 bits) designating the vertical position, name data (9 bits) designating kinds of characters, color codes (3 bits) designating color pallets, flip codes (2 bits) designating reversal display in every direction (up and down, right and left) of characters, size codes (1 bit) designating dot size of characters, and priority data (2 bits) designating a priority order with respect to the still pictures.

Still picture character data include name data (8 bits) designating kinds of characters, color data (8 bits) of each picture element constituting the character, and etc. per one character. A still picture (background picture) is constituted by displaying a large number of still picture characters in combination. Such still picture character data are written within a screen RAM of the VRAM 7 shown in FIG. 3 in a position corresponding to an H position and a V position on a monitor 8 to display the character as shown in FIG. 4. Referring to an example of FIG. 4, a first character is displayed at a position on the screen of the monitor 8 being expressed with H1, V1, and a second character is displayed at a position being expressed with H2, V2, and a third character is displayed at a position being expressed with H3, V3.

Figure 3:
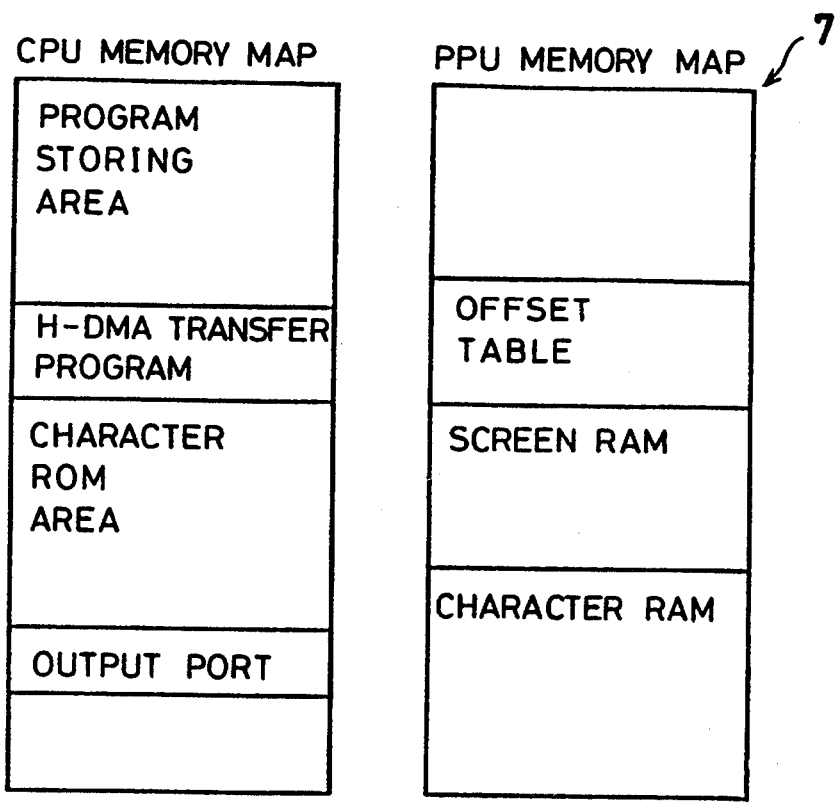
FIG. 3 is an illustrative view showing a memory map of the embodiment.

In addition, the offset table being formed within the VRAM 7 shown in FIG. 3 stores offset data of the character number up to N (in this embodiment, N=23) capable of being displayed by one line as shown in FIG. 5.

Furthermore, a character RAM of the VRAM 7 stores dot data of the still picture characters written in the screen RAM.

The RAM 4 is used as a work area of the CPU 2. The keyboard 5 inputs information for a player to control the moving characters.

Furthermore, a CPU interface 13 contained in the picture processing unit 1 is connected to the CPU 2 through the address bus 10, the data bus 11 and the control bus 12. A reference signal generator 6, the VRAM 7 and the CRT display 8 are connected to the picture processing unit 1.

The picture processing unit 1 transfers the picture data of moving pictures and still pictures to the VRAM 7 during a vertical blanking period or at a forcedly transferring timing based on the control of the CPU 2, and reads the picture data of the moving picture and/or the still picture stored in the VRAM 7, and converts the picture data into NTSC color television signals in this embodiment and outputs the same.

Specifically, a moving picture address control circuit 17, a still picture address control circuit 19, a VRAM interface 22 and a color signal generator 23 are connected to the CPU interface 13 contained in the picture processing unit 1 through a data bus 14. An address bus 15 is connected to the moving picture address control circuit 17, and the address bus 15 and the data bus 16 are connected to the still picture address control circuit 19 and a VRAM interface 22. A moving picture data processing circuit 18 and a still picture data processing circuit 20 are commonly connected to the data bus 16. The picture processing associated with moving pictures is carried out by the moving picture address control circuit 17 and the moving picture data processing circuit 18, and the picture processing associated with still pictures is carried out by the still picture address control circuit 19 and the still picture data processing circuit 20.

Outputs of the moving picture data processing circuit 18 and the still picture data processing circuit 20 are supplied to a priority control circuit 21. An output of the priority control circuit 21 is converted into RGB signals by a color signal generator 23 and supplied to the monitor 8, and is also converted into NTSC color television signals by an NTSC encoder 24 and outputted from an output terminal 9.

Figure 6:
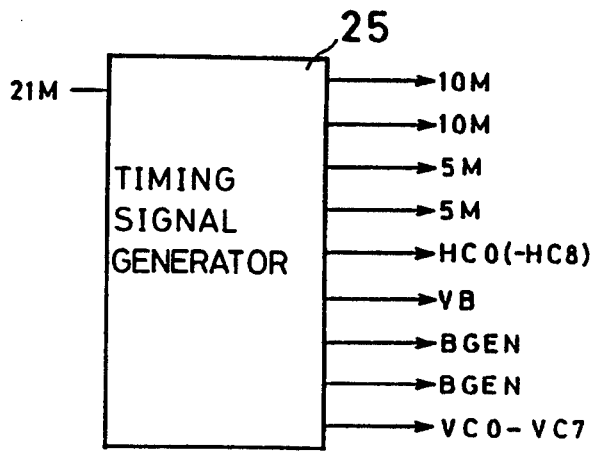
FIG. 6 is a block diagram showing a timing signal generator.
Figure 7:
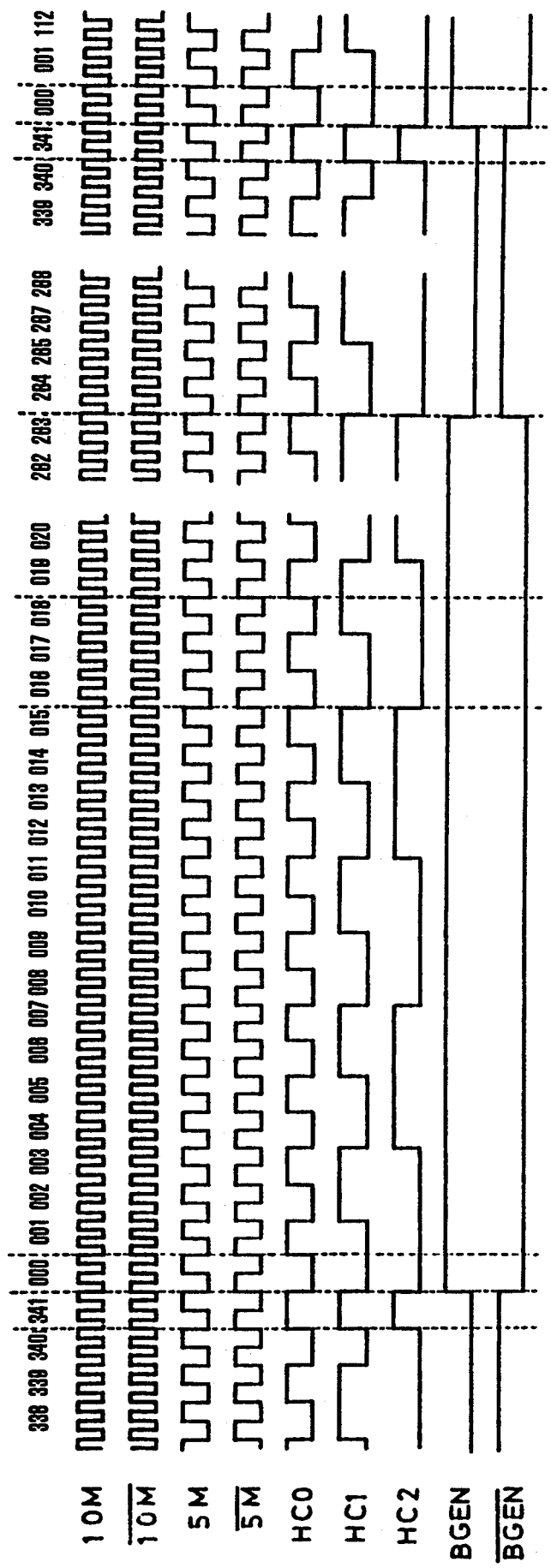

Furthermore, the picture processing unit 1 contains a timing signal generator 25 and an HV counter 26. The timing signal generator 25 as shown in FIG. 6 generates various kinds of timing signals shown in FIG. 7 and FIG. 8A, FIG. 8B, based on the fundamental clock of about 21 MHz outputted from the reference signal generator 6. That is, the timing signal generator 25 performs frequency dividing in $\frac{1}{2}$ of the fundamental clock thereby outputs signals 10M and /10M (However, the symbol "/" shows reversal in the specification.), and further performs frequency dividing in $\frac{1}{2}$ thereby outputs signals 5M and /5M. One cycle of the signals 5M and /5M corresponds to the display time of one dot (pixel) on the screen of the monitor 8. Therefore, a horizontal blanking signal HB is obtained by counting the signal 5M, and a vertical blanking signal is obtained by counting the signal HB. Then, the HV counter 26 counts the signal 5M from the timing generator 25, and outputs counter data H, V designating display position of the raster scan monitor 8. The data are shown as horizontal position data HC0–HC8 of 9 bits and vertical position data VC0–VC7 of 8 bits, for convenience, in FIG. 6. However, the least significant bit HC0 of the H counter is used in an operation described later. The signal BGEN is a signal to enable the VRAM 7, and becomes "1" during the display period. The signal /BGEN is a reversal of the signal BGEN.

Figure 9:
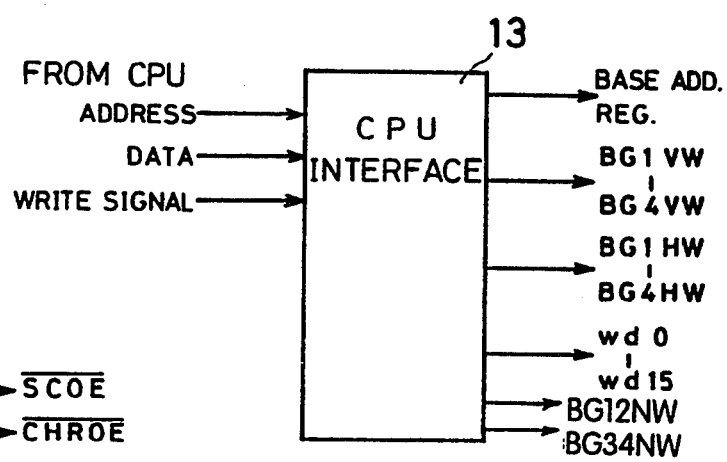
FIG. 9 is a block diagram showing a CPU interface included in a still picture address control circuit in FIG. 1.

The CPU interface 13 transfers data regarding still picture characters and moving picture characters to the VRAM interface 22 by a direct memory access, during the vertical blanking period or forcedly transferring instruction, based on the control of the CPU 2. Signals BG1VW–BG4VW and BG1HW and BG4HW from the CPU interface 13 shown in FIG. 9 are write signals to an offset register described later, and signals BG12NW and BG34NW are write signals to a base address register. However, wd0–wd15 is write data to each register at a write timing.

The data regarding still picture characters and moving picture characters forwarded to the VRAM interface 22 are written into the VRAM 7 in advance by the VRAM interface 22.

The moving picture address control circuit 17 includes a moving picture attribute memory, an in-range detecting circuit and a moving picture address data generator, and details thereof are known, for example, in Japanese patent application laid-open No. 59-118184 (patent publication No. 2-7478) filed by the same applicants as that of the present invention. Attribute data of 128 moving picture characters are transferred to the moving picture attribute memory from the CPU 2 through the CPU interface 13 and the data bus 14 during a certain vertical blanking period to be stored therein. The in-range detecting circuit carries out retrieval of data to be displayed on a next line among the data stored in the moving picture attribute memory for each line. The moving picture address data generator generates stored addresses of the VRAM 7 showing positions on the screen of the CRT display 8 when having been reversed with V flip data being "1" among the attribute data being in-range detected, and outputs the addresses through the address bus 15. On the other hand, when the V flip data is "0", addresses of the VRAM 7 corresponding to positions of the character data on the screen are outputted to the VRAM 7 through the address bus 15 as they are. In response to this, the VRAM 7 gives color data (4 bits per 1 dot) of a moving picture which is stored in the moving picture character area and corresponds to the address outputted from the moving picture address generator in the moving address control circuit 17 to the moving picture data processing circuit 18 through the data bus 16. The moving picture address generator gives H flip data (1 bit), the color data (3 bits) and the priority data (2 bits) among the attribute data of the moving characters being in-range detected to the moving picture data processing circuit 18 directly.

Therefore, data of 10 bits per one dot including the color data being read from the VRAM 7, the H flip data directly given from the moving picture address control circuit 17 and the priority data are inputted to the moving picture data processing circuit 18 sequentially for 256 dots of one line.

After storing temporarily the data of the next one line inputted during the horizontal blanking period, the moving picture data processing circuit 18 temporarily stores the data of 9 bits per one dot excluding the H flip data in the order contrary to the input order when the flip data involved in the data is "1", thereby it carries out the H flip processing. However, threshold value processing circuit 18 temporarily stores the data of 9 bits in the same sequence as in the input when the H flip data is "0". The moving picture data of one line temporarily stored are outputted to the priority control circuit 21 synchronous with the horizontal scanning based on the count data H from the HV counter 26.

The still picture address control circuit 19, as hereinafter explained in detail, calculates read addresses (16 bits) of the name data stored in advance in the VRAM 7, i.e., the screen RAM in corresponding to dots of the still picture characters, based on including the offset data of the screen given from the CPU 2 and the flip data, and the count data H and V given from the HV counter 26, and supplies calculated addresses through the address bus 15 to the VRAM 7, i.e., the character RAM. Moreover, the still picture address control circuit 19 calculates in the scroll processing time of the still pictures, read addresses of the name data corresponding to dots of the still picture characters, based on the offset data given from the CPU 2 and the count data H and V given from the HV counter 26, and gives calculated addresses to the VRAM 7.

The screen RAM of the VRAM 7 gives the name data stored in the address designated by the read addresses from the still picture address control circuit 19 through the data bus 15 to the still picture address control circuit 19. In response to this, the still picture address control circuit 19 gives addresses being constituted by position data of dots corresponding to the display position of the still picture characters through the address bus 15 to the character RAM of the VRAM 7. The character RAM of the VRAM 7 reads the color data of 8 bits stored in the address given from the still picture control circuit 19, and supplies the data through the data bus 16 to the still picture data processing circuit 20. In response to this, the still picture data processing circuit 20 latches the color data of 8 bits per one dot being inputted, and then gives the data to the priority control circuit 21 based on the count data H of an output of the HV counter 26.

Referring to the priority data, among dot data of the moving picture characters of 7 bits inputted from the moving picture data processing circuit 18 and dot data of the still picture characters of 8 bits inputted from the still picture data processing circuit 20, the priority control circuit 21 outputs those having higher priority to the color signal generator 23. For example, the priority control circuit 21 outputs the still picture data composed of the most significant three bits "000" and the color data of 8 bits to the color signal generator 23 when the priority data included in the moving picture data are "00", and it outputs the moving picture data of total of 7 bits composed of the color data of 3 bits and the color data of 4 bits to the color signal generator 23 when the priority data are "01".

The color signal generator 23 includes a color table composed of RAM having address of 8 bits, and stores color data given from the CPU 2 to the color table during the vertical blanking period. During the horizontal scanning period, the color signal generator 23 reads the color data stored in corresponding address of the color table, based on the dot data of moving picture or still picture of 8 bits inputted from the priority control circuit 21, and then converts those the data into RGB signals, each color having 5 bits. Further, the color signal generator 23 the RGB signals directly to the RGB monitor 8 or the NTSC encoder 24, synchronizing with the count data H and V given from the HV counter 26. The NTSC encoder 24 converts the RGB signals in digital/analog conversion per each color, and then converts the signals into the NTSC color television signal and outputs the same from the output terminal 9.

Figure 1:
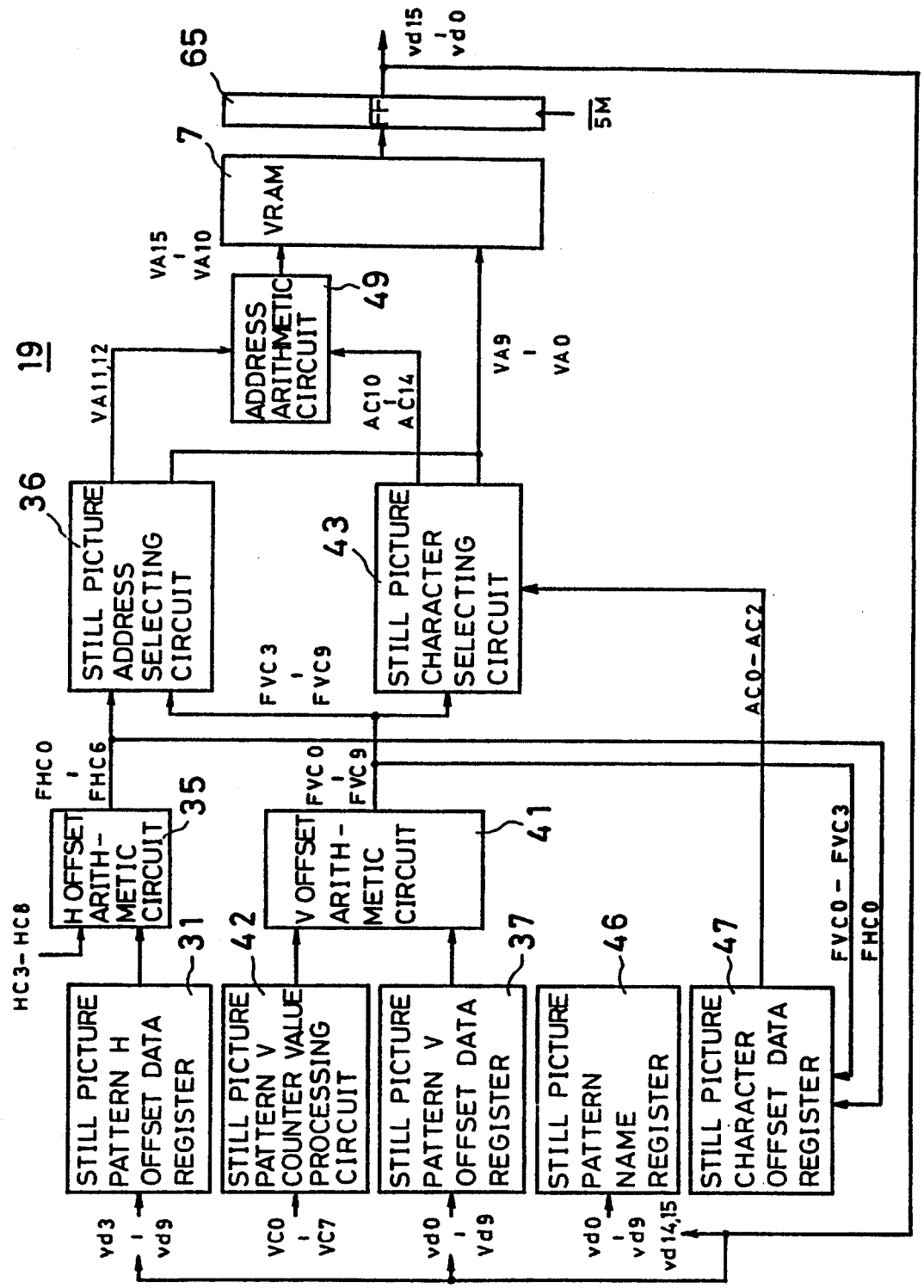
FIG. 1 is a block diagram showing a still picture address control circuit as one embodiment in accordance with the present invention.
Figure 10:
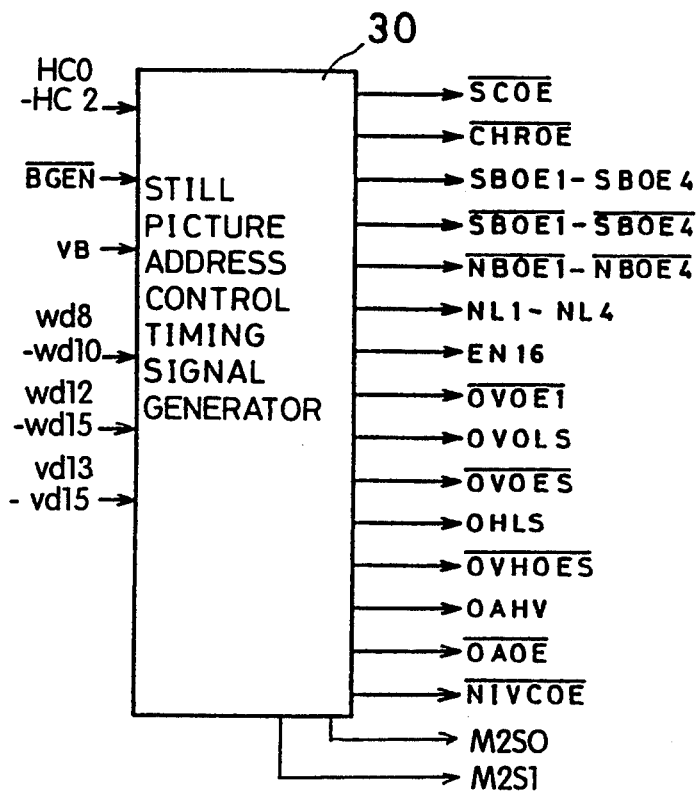
FIG. 10 is a block diagram showing a still picture address control timing generator included in the still picture address control circuit of FIG. 1.

Next, referring to FIG. 1, the still picture address control circuit 19 of the present invention will be described in detail. The still picture address control circuit 19 includes a still picture address control timing signal generator 30 shown in FIG. 10, and the still picture address control timing signal generator 30 receives HC0-HC2, /BGEN and VB from the timing signal generator 25 as well as data bits wd0-wd10, wd12-wd15 and vd13-vd15, and outputs various kinds of signals. A signal /SCOE is a signal to enable the screen RAM, and a signal /CHROE is a signal to enable the character RAM. Signals SBOE1-SBOE4 specify a timing for reading a screen base register, signals /NBOE1-/NBOE4 specify a timing for reading a name base register, and signals NL1-NL4 specify a timing for writing a name register. As signal EN16 is a signal for changing character size, showing a character of 16×16 dots with "1" and a character of 8×8 dots with "0". As signal /OVOE1 is a timing signal for reading a V offset register, a signal OVLS is a timing signal for writing a V offset change register, a signal /OVOES is a timing signal for reading the V offset change register, a signal OHLS is a timing signal for writing an H offset change register, and a signal /OHOES is a timing signal for reading the H offset change register. As signal OAHV is a signal for discriminating between H data and V data of the offset data table, showing the H data with "0" and the V data with "1". Signals /OAOE and /NIVCOE function as control signals for tri-state buffers, respectively.

Returning to FIG. 1, a still picture pattern H offset data register 31 included in the static picture address control circuit 19 receives data bits vd3–vd9 on the data bus 14 sent from the CPU 2, and latches them as the H offset data. That is the still picture pattern H offset data register 31, as shown in FIG. 11, comprises an H offset register 32, an offset table H register 33 and an H offset change register 34, each being in 7 bits. The H offset register 32 is enabled by the previous signal /OHOE1, and latches data wd3–wd9 in response to the signal BG1HW. The offset table H register 33 is enabled by the previous signal /SBOE, and latches data wd3–wd9 in response to the signal BG3HW. The H offset change register 34 is enabled by the previous signal /OHOES, and latches data vd3–vd9 in response to the signal OHLS. The data vd3–vd9 is data read from the offset data table (FIG. 3 and FIG. 4).

Then, the data of these registers 32, 33 and 34 are supplied to an H offset arithmetic circuit 35. The H offset arithmetic circuit 35, as shown also in FIG. 11, includes a full adder 35a, and the H offset data (7 bits) from the registers 32, 33 and 34 are supplied to one input of the full adder 35a, and the H position data HC3–HC8 (6 bits) from the timing signal generator 25 are supplied to the other input thereof. Accordingly, data FHC0–FHC6 showing a read position in the horizontal (H) direction of the screen RAM, i.e., the VRAM 7a is outputted from the full adder 35a, i.e., the H offset arithmetic circuit 35. The data FHC0–FHC6 is inputted to a still picture pattern address selecting circuit 36.

Figure 12:
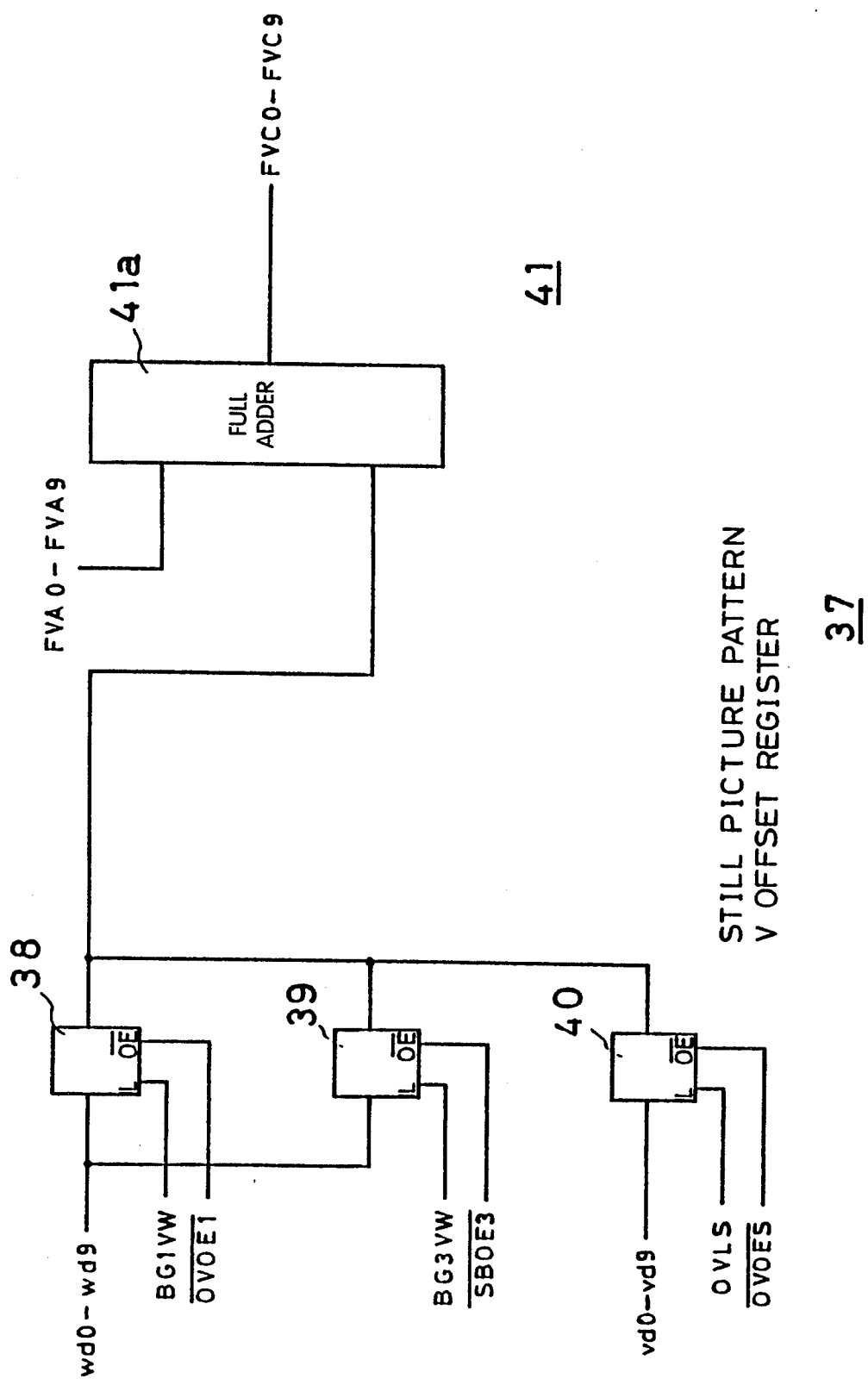
FIG. 12 is a block diagram showing a still picture pattern V offset data register and a V offset arithmetic circuit included in the still picture address control circuit of FIG. 1.

A still picture pattern V offset data register 37 receives data bits vd0–vd9 on the data bus 14 sent from the CPU 2, and latches them as the V offset data. That is, the still picture pattern V offset data register 37, as shown in FIG. 12, comprises a V offset register 38, an offset table V register 39 and a V offset change register 40, each being of 7 bits. The V offset register 38 is enabled by the previous signal /OVOE1, and latches data wd0–wd9 in response to the signal BG1VW. The offset table V register 39 is enabled by the previous signal /SBOE3, and latches data wd0–wd9 in response to the signal BG3MW. The V offset change register 40 is enabled by the previous signal /OVOES, and latches data vd0–vd9 in response to signal OVLS. The data vd0–vd9 is data read from the offset data table.

Then, the data of the registers 38, 39 and 40 are supplied to a V offset arithmetic circuit 41. The V offset arithmetic circuit 41, as shown also in FIG. 12, includes a full adder 41a, and the V offset data (10 bits) from the registers 38, 39 and 40 are supplied to one input of the full adder 41a, and the V position data FVA0–FVA9 (10 bits) from a still picture pattern V counter value processing circuit 42 is supplied to the other input thereof. Accordingly, data FVC0–FVC9 showing a read position in the vertical (V) direction of the screen RAM, i.e., the VRAM 7 is outputted from the full adder 41a, i.e., the V offset arithmetic circuit 41. The data FVC0–FVC9 is inputted to a still picture character address selecting circuit 43.

Figure 13:
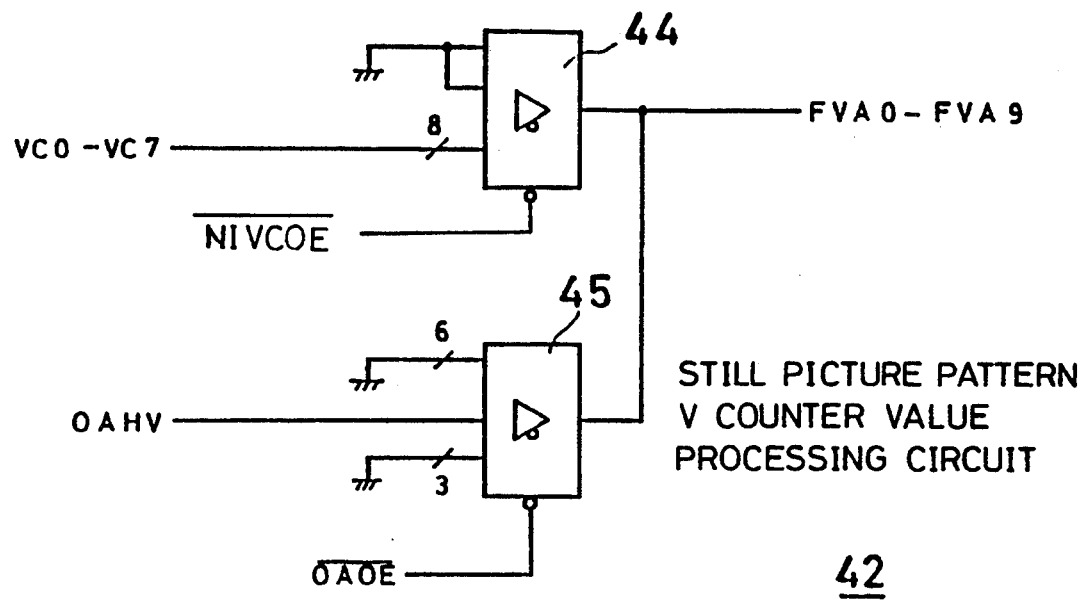
FIG. 13 is a block diagram showing a still picture V count value processing circuit included in the still picture address control circuit of FIG. 1.

The still picture pattern V counter value processing circuit 42, as shown in FIG. 13, comprises a tri-state buffer 44 receiving the V position data VC0–VC7 from the timing signal generator 25 and a tri-state buffer 45 receiving the signal OAHV outputted from the still picture address control timing signal generator 30. These tri-state buffers 44 and 45 are controlled by the signals /NIVCOE and /OAOE, respectively. Therefore, when the offset data table is read, the signal /OAOE is enabled and the tri-state buffer 45 is turned on. Accordingly, the data FVA0–FVA9 with both upper 6 bits and lower 3 bits being "0" and only one bit being "1" are outputted from the tri-state buffer 45. However, when the offset data table is not referenced, since the tri-state buffer 44 is activated, the data FVA0–FVA9 with upper 2 bits being "0" and lower 8 bits being data VC0–VC7 from the timing signal 25 are outputted. Thus, the still picture pattern V counter value processing circuit 42 changes input data to the V offset arithmetic circuit 41, according to whether the reference to the data table is necessary or not.

A still picture name data register 46 receives the data bits vd0–vd9 on the data bus 14 sent from the CPU 2, and latches them as name data of still picture characters.

A still picture character offset data register 47 receives the data FHC0 and FVC0–FVC9 from the H offset arithmetic circuit 35 and the V offset arithmetic circuit 41, and outputs data AC0–AC2 showing which dot is among 8 dots in the V direction of one character.

Figure 14:
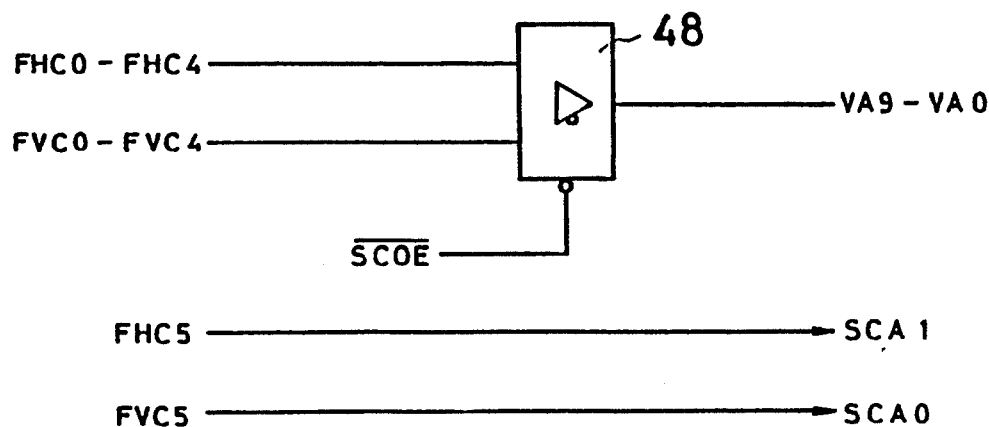
FIG. 14 is a block diagram showing a still picture pattern address selecting circuit included in the still picture address control circuit of FIG. 1.

A still picture pattern address selecting circuit 36, as shown in FIG. 14, comprises a tri-state buffer 48, and the signal /SCOE from the still picture pattern address control timing signal generator 30 is given as its control signal, and the data FHC0–FHC4 (5 bits) from the H offset arithmetic circuit 35 and the data FVC0–FVC4 (5 bits) from the V offset arithmetic circuit 41 are given as inputs. When the signal /SCOE is enabled, the data VA0–VA9 is outputted from the tri-state buffer 48. The data VA0–VA9 become lower address of the screen RAM and are supplied to an address arithmetic circuit 49. Also the data FHC5 and FVC5 inputted to the still picture pattern address selecting circuit 36 is outputted as data SCA1 and SCA0 as they are. The data SCA1 and SCA0 become read address of the offset data table and are supplied to the address arithmetic circuit 49.

Figure 15:
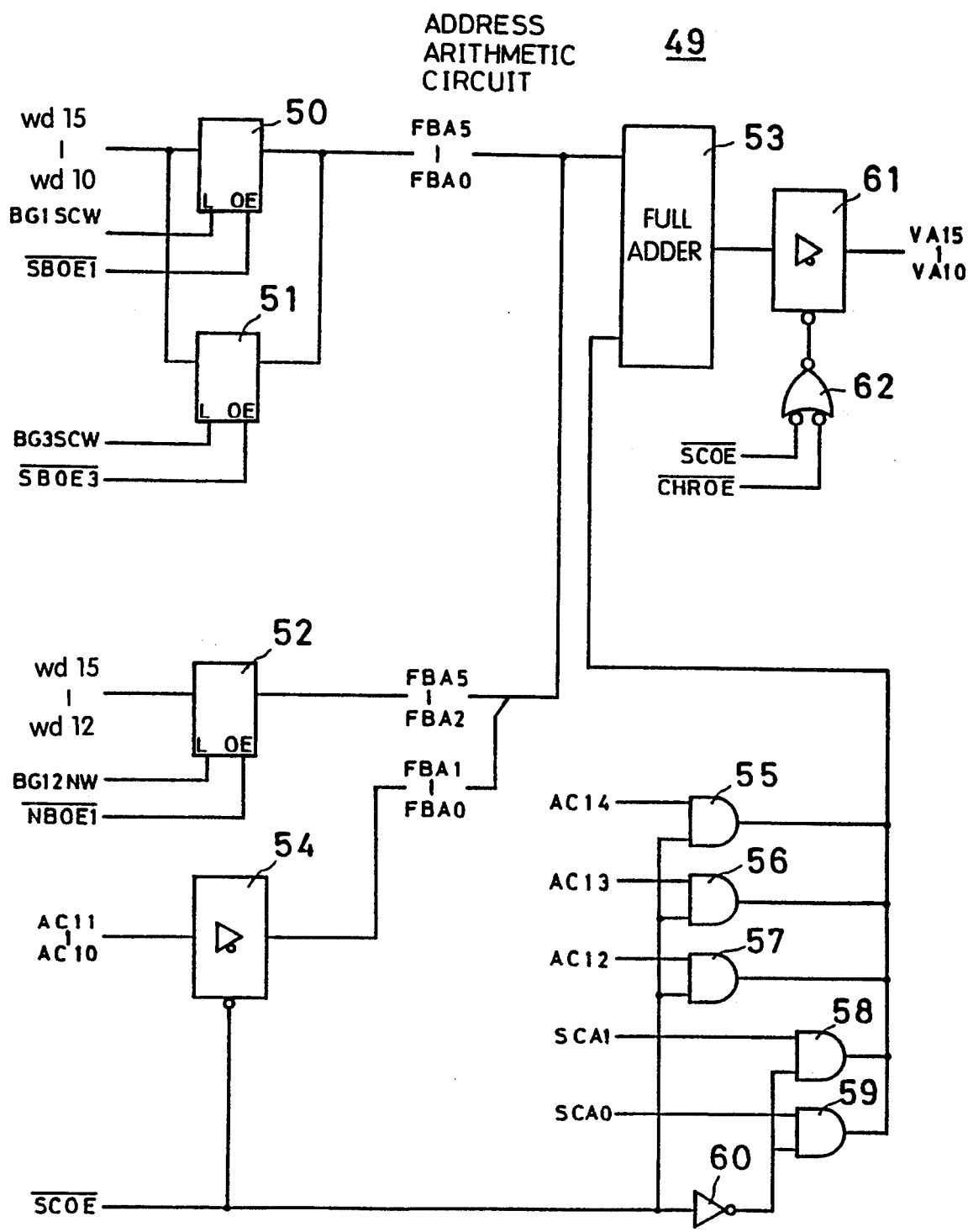
FIG. 15 is a block diagram showing an address arithmetic circuit included in the still picture address control circuit of FIG. 1.

The address arithmetic circuit 49, as shown in FIG. 15, comprises a screen base address register 50, an offset data table base address register 51 and a name base address register 52. The screen base address register 50 is enabled by the signal /SBOE1 when it reads the name data from the screen RAM, and the register 50 latches the data wd15–wd10 in response to the signal BG1SCW. The offset data table base address register 51 is enabled by the signal /SBOE3 when it reads the offset data table, and the register 51 latches data wd15–wd10 in response to the signal BG3SCW. The name base address register 52 is enabled by the signal /NBOE1 when it reads out dot data from the character RAM, i.e., the VRAM 7a, and the register 52 latches the data wd15–wd12 in response to the signal BG12NW. Then, data FBA5–FBA0 (6 bits) outputted from the registers 50 and 51 are given to one input of a full adder 53.

Also the address arithmetic circuit 49 comprises a tri-state buffer 54, and the signal /SCOE is given as its control signal and inputs thereof are AC11 and AC10. Output data FBA1 and FBA0 of the tri-state buffer 54, together with output data FBA5–FBA2 from the name base address register 52, are given to one input of the full adder 53.

The signal /SCOE is supplied commonly to one inputs of AND gates 55, 56 and 57, and the signal /SCOE inverted by an inverter 60 is supplied as one input of AND gates 58 and 59. The data SCA1 and SCA0 from the still picture pattern address selecting circuit 36 are supplied to other inputs of the AND gates 58 and 59, respectively. Outputs (5 bits) of these AND gates 55–59 are supplied to the other input of the full adder 53 as above described. That is, when the name data is read from the screen RAM, the data SCA0 and SCA1 are added as an increment from the base address in the full adder 53. Also when the dot data is read from the character RAM, the data AC12-AC14 showing an increment from the base address are added in the full adder 53. Therefore, the AND gates 55-59 change the two incremental data with the signal /SCOE at a time of reading the screen RAM, and gives the data to the full adder 53.

An output of the full adder 53 is outputted as upper address data VA10-VA15 of the VRAM 7 through a tri-state buffer 61 controlled by an output of a NOR gate 62. The signals /SCOE and /CHROE are given to two inputs of the NOR gate.

Figure 16:
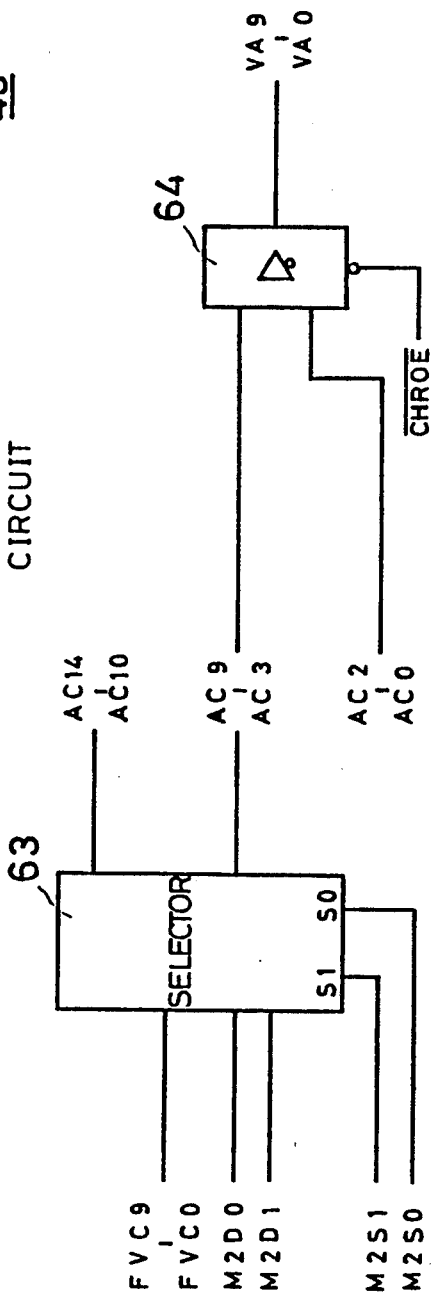
FIG. 16 is a block diagram showing a still picture character address selecting circuit of FIG. 1.

The still picture character address selecting circuit 43, as shown in FIG. 16, comprises a selector 63 and a tri-state buffer 64. The selector 63 is supplied with the data FVC0-FVC9, M2D0 and M2D1, and with data M2S1 and M2S0 as selection signals. The selector 63 outputs data AC3-AC14 varying as shown in the table of FIG. 16 in response to the selection signals. The data is given as lower address of the character RAM together with the upper address from the address arithmetic circuit 49 to the VRAM 7.

The dot data vd0-vd15 read from the VRAM 7 is outputted through a latch 65. The dot data vd0-vd15 is supplied to the still picture data processing circuit 20 (FIG. 2).

Figure 17:
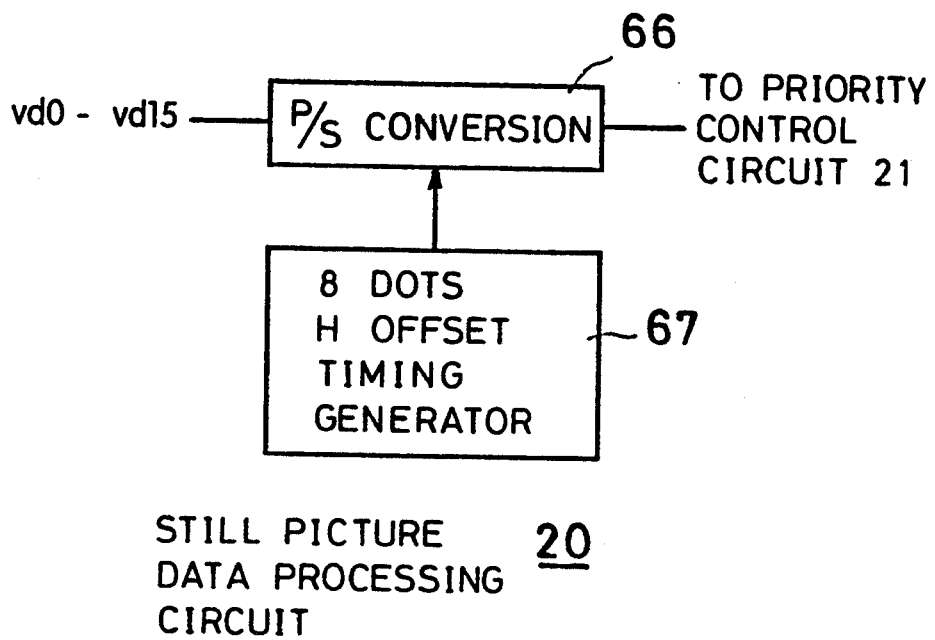
FIG. 17 is a block diagram showing a still picture data processing circuit included in FIG. 2.

The still picture data processing circuit 20, as shown in FIG. 17, comprises a P-S converter 66 and an H offset timing generator 67. In addition, as for the H offset timing generator 67, for example, a circuit similar to that disclosed in Japanese patent publication No. 63-37472 referred previously can be utilized. Therefore, a detailed description thereof will be omitted here by referring this. Then, the H offset timing generator 67 gives a timing signal for outputting the dot data as a bit serial signal from the P-S converter 66. The bit serial dot data from the P-S converter 66 are supplied to the priority control circuit 21 (FIG. 2).

In such arrangement, during an initial setting and the V blanking period, the still picture pattern data (screen data), dot data of each character and offset change data are written from the CPU 2 through the VRAM interface 22 into the VRAM 7. In addition, during this period, data are written from the CPU 2 through the CPU interface 13 into registers included in the still picture address control circuit 19 and the still picture data processing circuit 20, respectively.

Then, the H offset data from the still picture pattern H offset data register 31 and the H count value are added by the H offset arithmetic circuit 35. On the other hand, the V offset data from the still picture pattern V offset data register 37 are added to the output from the still picture pattern V counter value processing circuit 42 in the V offset arithmetic circuit 41. The output from the still picture pattern V counter value processing circuit 42 is V count value basically.

The output FHC0-FHC6 of the H offset arithmetic circuit 35 and the output FVC3-FVC9 of the V offset arithmetic circuit 41 are inputted to the still picture pattern address selecting circuit 36. The output FVC0-FVC3 of the V offset arithmetic circuit 41 and the output FHC0 from the H offset arithmetic circuit 35 are given to the still picture character offset data register 47 and latched as the character offset data.

The still picture pattern address selecting circuit 36 converts the inputted data according to the conditions such as a size of character. The data VA0-VA9 of 10 bits is given as the address of the VRAM 7. Also the address VA10-VA15 added by base address and the increment data are outputted from the address arithmetic circuit 49, and therefore, the VRAM 7 is addressed by the address data VA0-VA15 of 16 bits. The data read from the VRAM is held as the still picture pattern data (screen data) in the still picture name register 46.

Moreover, the offset change data read from the VRAM 7 is held in the still picture pattern H offset data register 31 and the still picture pattern V offset data register 37, and the above-mentioned operation is carried out.

In the above-mentioned screen processing, the character name data being read from the VRAM 7 and held in the still picture name data register 46 are given as the data FVA0-FVA9 to the V offset arithmetic circuit 41. In this case, the V offset arithmetic circuit 41 operates as a character offset arithmetic circuit, and gives the address data FVC0-FVC9 to the still picture character address selecting circuit 43 as above described. Then, in the still picture character address selecting circuit 43, the data FVC0-FVC9 are converted in accordance with the cell selection signals M2S0 and M2S1 from the still picture address control timing signal generator 30, and the converted data is outputted as the data AC3-AC14. The data AC10-AC14 are given to the address arithmetic circuit 49, and the data AC3-AC9, together with the above-mentioned data AC0-AC2, is given as the address VA0-VA9 of the VRAM 7. In addition, the address arithmetic circuit 49 adds the data AC10-AC14 and the value of the name base address register, and a result is outputted as the address VA10-VA15 of the VRAM 7. Therefore, the dot data of the still picture characters are read from the VRAM 7 through the latch 65.

The character dot data are outputted as dot data in a bit serial fashion in response to the conversion timing signal from the character offset timing generator 67 by the above-mentioned P-S converter 66.

Figure 18:
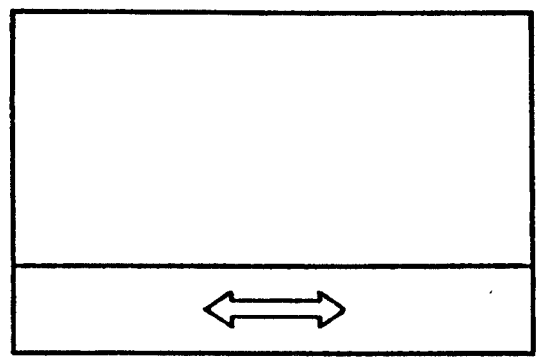
FIGS. 18 and 19 are illustrative views showing scroll conditions on a monitor screen.
Figure 19:
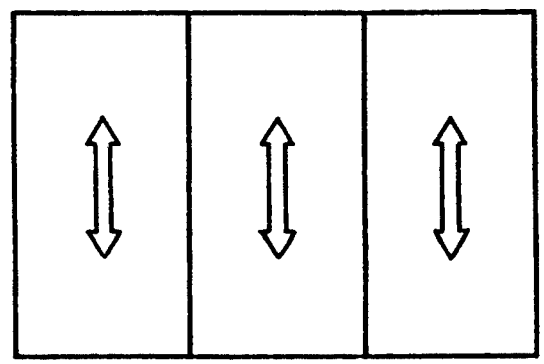

According to the embodiment, the offset data is set to the offset data table and the initial offset data are only given from the CPU, whereby the still picture character can be scrolled easily in the vertical direction in a portion of the monitor screen divided in the horizontal direction as shown in FIG. 19. Also by this embodiment, it is needless to say that the scrolling in the horizontal direction is possible in a portion of the screen divided in the vertical direction as shown in FIG. 18. If both are combined, various kinds of scrolling are possible.

In scrolling, a scroll in characters and/or in dots are feasible.

In the above-mentioned embodiment, if changed offset data is used for changing a window area, the window area can be easily changed.

Besides, in the above-mentioned embodiment, the offset data are set for each character on the offset data table. However, the same offset data may be set for a plurality of characters.

Furthermore, the case with the character of 8×8 dots has been explained as a base, but when the character of 16×16 dots can be displayed, the character may be considered as one character in setting the offset data.

Also in the embodiment, the offset table is stored in the VRAM according to a program. However, if the offset data table is formed on the ROM and a plurality of offset data tables corresponding to respective conditions are used, it may only chose which offset data table should be used.

In addition, a memory cartridge incorporating a semiconductor memory is used as an external storage device in the above described embodiments; however, it is possible to use an external storage device such as a CD-ROM in the present invention. In a case of use of the memory cartridge, the program data including the character data, color data, priority data and etc. and the offset table that are stored in the semiconductor memory as described above, and the CPU 2 generates control data for the moving picture characters and the still (background) picture characters on the basis of the program data read from the semiconductor memory and outputs the same to the picture processing unit 1.

In contrast, in a case of use of the CD-ROM, the above described program data and offset table are optically recorded as digital data in the CD-ROM (not shown). In addition, an optical reader for optically reading recorded date on the CD-ROM is connected to a suitable connector such as a expansion connector. When the CD-ROM is used as the external storage device, a memory cartridge is also used. In this case, the memory cartridge is comprised with a ROM (not shown) that stores a starting program for controlling an operation of the optical reader, a buffer RAM (not shown) for temporarily storing the program data read from the CD-ROM, and etc. Then, prior to a start of a display operation, the CPU 2 applies control data to the optical reader on the basis of the starting program of the ROM to cause the optical reader read the recorded data of the CD-ROM. A portion of the character data read from the CD-ROM is transferred to the character RAM and the program data is transferred to the buffer RAM included in the memory cartridge. The CPU 2 controls the picture processing unit 1 on the basis of the program data stored in the buffer RAM. That is, after the data read from the CD-ROM by the optical reader has been transferred to the respective memories, the CPU 2 and the picture processing unit 1 execute the display operation by accessing the respective memories as done in the previous embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still picture display apparatus which displays still pictures containing an arrangement of a predetermined number of characters each constituted by a combination of a predetermined number of dots on a screen of a raster scan monitor, said still picture display apparatus comprising:

first storage means for storing character data of the characters;

second storage means for storing a plurality of vertical offset data per one horizontal line, each of said plurality of vertical offset data being a vertical offset amount in each of a plurality of horizontally divided portions of said screen of said raster scan monitor;

first read means for reading one of said plurality of vertical offset data every time a corresponding one of said plurality of horizontally divided portions of said screen to be scanned;

second read means for reading the character data from said first storage means based on one of the vertical offset data read by said first read means and a horizontal position and a vertical position on said raster scan monitor to apply the same to said raster scan monitor, wherein said second storage means includes a readable/writable memory, and said apparatus further comprising vertical offset data write means for writing the vertical offset data corresponding to each character into said memory, and wherein said vertical offset data write means includes vertical offset data changing means for changing and writing the vertical offset data per each frame of said raster scan monitor, so that a vertical scrolling is performed in at least one of said plurality of horizontally divided portions of said screen of said raster scan monitor.

2. A still picture display device as set forth in claim 1, wherein said second storage means includes vertical offset data storage domains for storing the vertical offset data corresponding to the characters per each horizontal line, and said apparatus further comprising first domain designating means for designating the vertical offset data storage domains corresponding to an arbitrary horizontal line, said first read means reading one of the vertical offset data corresponding to the characters in a horizontal line designated by said first domain designating means.

3. A still picture display apparatus as set forth in claim 2, wherein said first domain designating means includes means for designating the vertical offset data storage domains contained in said second storage means corresponding to one desired horizontal line and for changing the vertical offset data storage domains corresponding to the horizontal line per each frame, so that a vertical scroll is performed in at least one of said horizontally divided portions of said screen.

4. A still picture display apparatus as set forth in claim 2, wherein said second storage data includes horizontally offset data storage domains for storing horizontal offset data corresponding to the characters per each horizontal line and second domain designating means for designating the horizontal offset data storage domains corresponding to an arbitrary horizontal line and said first read means reads the horizontal offset data corresponding to the characters in a horizontal line designated by said second domain designating means, and wherein said second domain designating means includes means for designating the horizontal offset data storage domains contained in said second storage means corresponding to one desired horizontal line and for changing the horizontal offset data storage domains corresponding to the horizontal line per each horizontal line, so that a horizontal scroll is performed in at least one of said horizontally divided portions of said screen.

5. A still picture display apparatus as set forth in claim 1, wherein said second storage means stores a plurality of horizontal offset data, each of said horizontal offset data being a horizontal offset amount in each of a plurality of horizontally divided portions of said screen and said first reading means reading said horizontal offset data every time a corresponding one of said plurality of horizontally divided portions of said screen is to be scanned, said second read means reading the horizontal offset data read by the first read means, and a horizontal and a vertical position on said raster scan monitor to apply the same to said raster scan monitor, said apparatus including horizontal offset data write means for writing the horizontal offset data into said readable/writable memory, and wherein said horizontal offset data write means includes horizontal offset data changing means for changing and writing the horizontal offset data per each horizontal line, so that a horizontal scrolling is performed in at least one of said plurality of horizontally divided portions of said screen of said raster scan monitor.

6. An external storage device used in association with a still picture display apparatus which displays still picture containing an arrangement of a predetermined number of characters being constituted by a combination of a predetermined number of dots, said external storage device comprising:

first storage means for storing character data of the characters; and second storage means for storing a plurality of vertical offset data per one horizontal line, each of said plurality of vertical offset data being a vertical offset amount in each of a plurality of horizontally divided portions of said screen of said raster scan monitor;

said still picture display apparatus including first read means for reading one of said plurality of vertical offset data every time a corresponding one of said plurality of horizontally divided portions of said screen to be scanned; and second read means for reading the character data from said first storage means based on one of the vertical offset data read by said first read means and a horizontal position and a vertical position on said raster scan monitor to apply the same to said raster scan monitor, wherein said second storage means includes a readable/writable memory, and said apparatus further comprising vertical offset data write means for writing the vertical offset data corresponding to each character into said memory, and wherein said vertical offset data write means includes vertical offset data changing means for changing and writing the vertical offset data per each frame of said raster scan monitor, so that a vertical scrolling is performed in at least one of said plurality of horizontally divided portions of said screen of said raster scan monitor.

7. An external storage device as set forth in claim 6, wherein said second storage means includes vertical offset data storage domains for storing the vertical offset data corresponding to the characters per each horizontal line, and said apparatus further comprising first domain designating means for designating the vertical offset data storage domains corresponding to an arbitrary horizontal line, said first read means reading one of the vertical offset data corresponding to the characters in a horizontal line designated by said first domain designating means.

* * * * *